Aug. 25, 1964  J. FOLEY  3,145,604
BAND SAW GUIDE
Filed Dec. 14, 1961
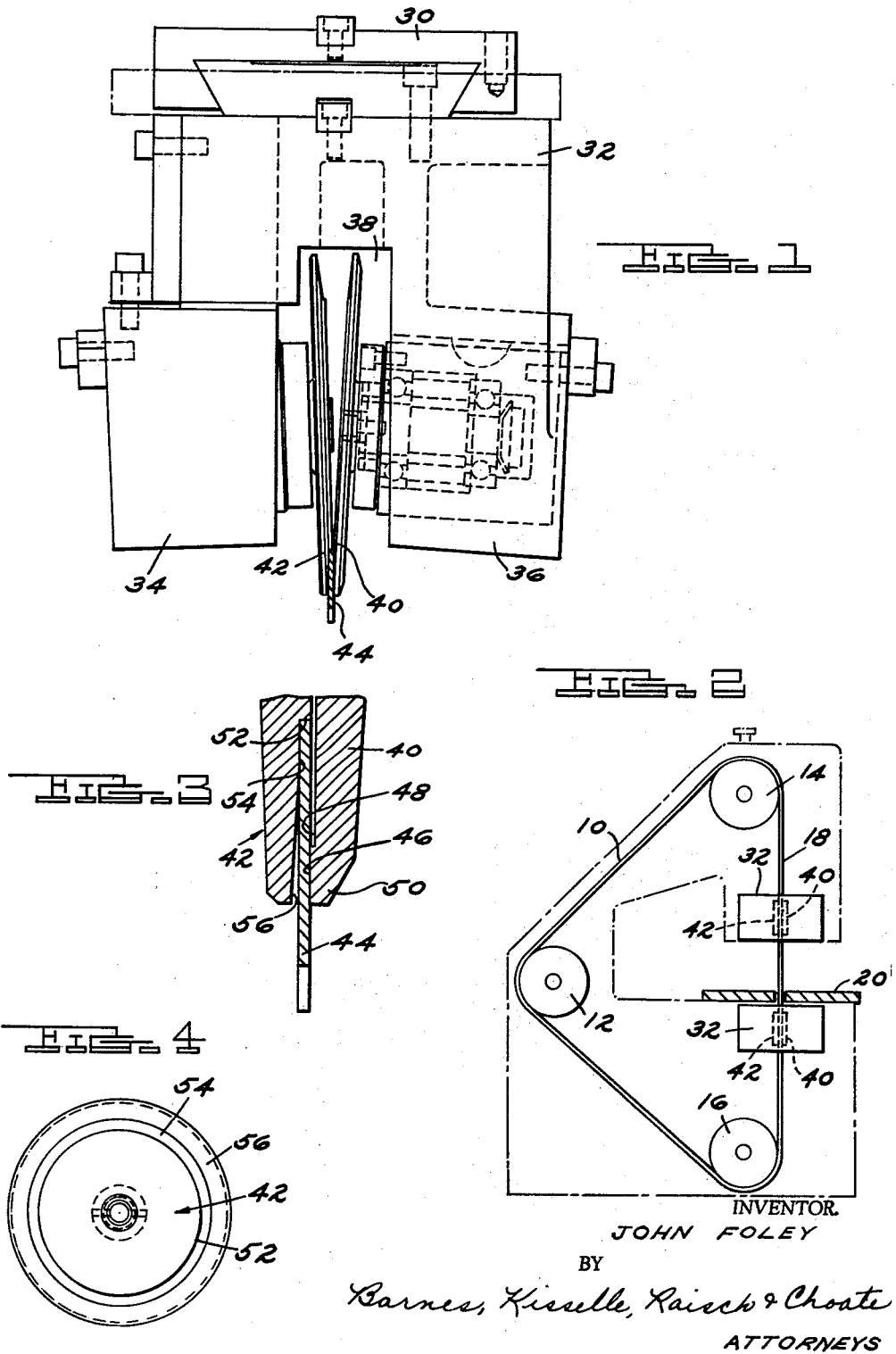
INVENTOR.
JOHN FOLEY
BY
Barnes, Kisselle, Raisch & Choate
ATTORNEYS United States Patent Office 3,145,604
Patented Aug. 25, 1964

3,145,604
BAND SAW GUIDE
John Foley, Hazel Park, Mich., assignor to Permanent Mold Die Co., Inc., Hazel Park, Mich., a corporation of Michigan
Filed Dec. 14, 1961, Ser. No. 159,276
3 Claims. (Cl. 83—201)

This invention relates to a band saw guide and more particularly to a guide used with band saws for the cutting of metals.

More and more frequently now it is common to use a band saw as a cut-off tool for bar stock. Sometimes quite heavy loads are applied to this saw and the travel in feet per minute is very high. The usual band saw guides which consist of rollers positioned with their circumference in contact with the saw have to travel at tremendous speeds in order to match the travel of the saw. This causes breakdown of the bearings of these rollers and also wears the saw.

It is an object of the present invention to provide a band saw guide which has a minimal and spaced contact with the surfaces of the saw which prevents wear and cold working but which serves as an excellent guide. With the construction contemplated, it is possible to use much larger diameter wheels which consequently have a lower rate of travel at the bearing.

Other objects and features of the invention relating to details of construction and operation will be apparent in the following description and claims.

Drawings accompanying the disclosure and the various views thereof may be briefly described as follows:

FIGURE 1, an elevation of the band saw guide.

FIGURE 2, an outline view of the band saw machine showing the manner in which it is used.

FIGURE 3, an enlarged view in section showing the manner of contact of the guides with the saw.

FIGURE 4, an elevation of one of the guides.

Referring to the drawings:

The band saw 10 travels around rollers 12, 14 and 16 and has a straight run 18 which passes through a work table 20 where the saw may be used for cutting aluminum or brass at very high speeds or steel at a lower speed. Adjacent the table, on either side of the work, guide rollers are required to allow certain amount of pressure to be applied to the work through the saw.

In FIGURE 1, a band saw guide assembly is shown wherein a dovetail bracket 30 supports a main guide block 32 which has supported on it two bearing blocks 34 and 36. Each of these bearing blocks can be adjusted on the block 32 and the block 32 can be adjusted on the slide 30. Between bearing blocks is a space 38 wherein are mounted two guide wheels 40 and 42. It will be noted that these wheels are disposed at an angle to each other as a result of the bearing blocks being disposed at an angle on the mounting 32. The planes of the wheels are preferably disposed at approximately 10° to each other and 5° to the bisecting plane which coincides with the plane of the saw but the bearing blocks are adjustable on the mounting and the drawings show the planes of the wheels about 6° apart. This can be varied due to this adjustment.

A cross-section of the saw 44 is shown in FIGURE 1 and also in FIGURE 3 where the detail of the edges of the wheels 40 and 42 is shown. The wheel 40 has a small annular radial ledge or surface 46 which is generated by a line at an angle to the general plane of the wheel in an amount of about 2½°. The ledge 46 is set off by an annular depression 48 which is .004 to .008" below the annular ledge surface 46. A 30° chamfer surface 50 is cut on the outer edge of the wheel 40. The wheel 42 has an annular recess on its inner surface at the outer periphery which creates an axial shoulder 52 adjacent an annular surface 54 which is generated by a line which is 2½° off the general plane of the wheel 42. This surface extends radially for about one-half of the distance of the annular groove after which the surface of the groove at 56 tapers another 3° off the plane of the wheel. In a 6" wheel the radial extent of the surface 54 would be about .3125" while the radial extent of the surface 46 is about 0.25".

As will be seen from the enlarged FIGURE 3, the surface 54 bears against the saw at the back edge thereof while the shoulder 52 is in direct contact with the back edge. The surface 46 is in direct contact with the other side of the saw at the outer periphery while the surface 56 is spaced from the saw and the surface 48 is spaced from the saw. With the wheels disposed at an angle as shown in FIGURE 1, the actual contact with the generated surfaces 46 and 54 of the blade is very small almost, in theoretical terms, a point contact but actually, due to the slight side pressure and flexing of the saw blade a line contact, and yet the saw has a positive stabilizing and guiding relationship at the shoulder 52 as well as at the spaced surfaces 46 and 54. The drawings show, in FIGURE 3, the actual line contact since the geometry of the angles is such that this would result. This insures a non-buckling or twisting relationship of the saw even when considerable pressure is placed on it against the work. The wheel has operated in connection with a saw moving at 3000 lineal feet per second with good bearing life as well as saw life.

I claim:

1. A band saw guide comprising two relatively thin wheels disposed on axes wherein the wheels are each disposed in a plane which is approximately 5° to the plane of the saw having peripheral edges which overlie the back edge of the saw, each of said wheels having a radial surface of relatively short radial extent in contact with a side surface of the saw and one of said wheels having an axial surface in direct contact with the back edge of the saw, said radial contacting surfaces of the said respective wheels being spaced radially and lying directly adjacent surfaces of the wheel which are spaced from the saw surface, the surfaces of said wheels adjacent said radial surfaces being relieved to avoid contact with said saw.

2. A guide for a lineally traveling saw member which comprises two wheels disposed on opposite sides of the saw in planes which diverge from the saw in the amount of about 5° on either side of said plane respectively, one of said wheels having an axial surface for contacting the back edge of a saw and each of said wheels having radial surfaces for contacting the side edges of the saw, said radial surfaces being spaced radially one to contact the saw adjacent the back surface and one to contact the saw adjacent the periphery of the wheels, said wheels being mounted on suitable bearings to rotate in response to lineal motion of said saw, the surfaces of said wheels adjacent said radial surfaces being relieved to avoid contact with said saw.

3. A guide for a lineally traveling high speed saw member which comprises two guide wheels disposed on opposite sides of the plane of the saw to be guided and lying in planes converging to the plane of the saw at the saw path, one of said wheels having an axial shoulder to contact the back edge of the saw, and each of said wheels having annular, relatively narrow, generated surfaces spaced radially to contact a saw at spaced areas on opposite sides of the saw to locate and guide the saw into contact with a workpiece, the surfaces of said wheels radially adjacent said contact surfaces being relieved to avoid contact with a saw.

References Cited in the file of this patent

UNITED STATES PATENTS 340,964     Thomas _____ Apr. 27, 1886

FOREIGN PATENTS 64,959     Sweden _____ Apr. 10, 1928
566,963     Belgium _____ Mar. 14, 1958